United States Patent Office 3,082,163
Patented Mar. 19, 1963

3,082,163
METHOD FOR PREPARING URANIUM MONO-CARBIDE-PLUTONIUM MONOCARBIDE SOLID SOLUTION
Allen E. Ogard, Joseph A. Leary, and William J. Maraman, Los Alamos, N. Mex., assignors to the United States of America as represented by the United States Atomic Energy Commission
No Drawing. Filed Aug. 25, 1961, Ser. No. 134,060
2 Claims. (Cl. 204—193.2)

This invention relates to the preparation of solid solutions and more particularly to a method of preparing uranium monocarbide-plutonium monocarbide solid solutions.

A solid solution of uranium monocarbide and plutonium monocarbide is useful as a nuclear reactor fuel and is especially useful as a fuel in fast plutonium-239 breeder reactors. The solid solution form is desirable because such isotropic structures have superior properties under irradiation conditions and thermal cycling.

The preparation of uranium and plutonium carbides by reaction of their respective dioxides with carbon is desirable because the oxides represent readily available and relatively cheap starting compounds. When stoichiometric quantities of uranium dioxide, plutonium dioxide, and carbon are reacted by heating in vacuum, the resulting product is always a heterogeneous mixture of monocarbide and higher carbides such as di- and sesquicarbides. This structure is undesirable.

It is therefore an object of this invention to provide a method for the preparation of single phase solid solutions of uranium monocarbide-plutonium monocarbide.

An embodiment of the method herein disclosed is as follows: Uranium dioxide, plutonium dioxide, and graphite powders are mixed in a ratio based on the following calculation:

$$xUO_2 + yPuO_2 + (2+z)C \rightarrow U_xPu_yC_z + 2CO$$

The ratio of $y$ to $x$ will be determined by the nuclear reactor application. However, this value usually will be between .05 and .50 on an atomic basis. In the above equation, $x+y$ equals unity. The value of $z$ is selected so that $z$ is greater than .9 but less than unity. The powders after being mixed in the ratio as determined by the above calculation are compacted into an adherent mass by conventional equipment. The compacted mass is heated in a vacuum to a temperature of 1850° C. and held at this temperature until no further carbonaceous oxides in the form of gas are evolved. The resulting adherent mass is a single phase solid solution of plutonium monocarbide and uranium monocarbide which may be refabricated into the shape determined by the reactor design.

Solid solution structures of the following composition have been produced by this method:

$$U_{0.90}Pu_{0.10}C_{0.95}$$
$$U_{0.80}Pu_{0.20}C_{0.95}$$
$$U_{0.70}Pu_{0.30}C_{0.95}$$

It is understood that the above description is by way of illustration and is not to be considered as a limitation upon scope of this invention.

What is claimed is:

1. A method of preparing a single phase solid solution of uranium monocarbide and plutonium monocarbide comprised of the steps of mixing the powder form of uranium dioxide, plutonium dioxide and graphite in a ratio determined by the equation:

$$xUO_2 + yPuO_2 + (2+z)C \rightarrow U_xPu_yC_z + 2CO$$

where $x+y$ equals unity and $z$ is greater than .9 but less than unity, compacting, then heating the said powders in a vacuum to a temperature of 1850° C. and holding the mixture at this temperature until no additional carbonaceous oxides are evolved.

2. A method of preparing a single phase solid solution of uranium monocarbide and plutonium monocarbide comprised of the steps of mixing the powder of uranium dioxide, plutonium dioxide, and graphite in a ratio determined by the equation:

$$xUO_2 + yPuO_2 + (2+z)C \rightarrow U_xPu_yC_z + 2CO$$

where $x$ equals .8, $y$ equals .2, and $z$ equals .95, compacting, then heating the said powders in a vacuum to a temperature of 1850° C. and holding the mixture at this temperature until no additional carbonaceous oxides are evolved.

References Cited in the file of this patent

FOREIGN PATENTS 1,055,704    Germany _____ Apr. 23, 1959

OTHER REFERENCES

AEC Document NDA–2140–2, October 1959, pp. 2, 4 and 31 relied upon.